(12) United States Patent
Zhan et al.

(10) Patent No.: US 12,493,185 B2
(45) Date of Patent: Dec. 9, 2025

(54) OPTICAL DISPLAY SYSTEM AND ELECTRONICS DEVICE

(71) Applicants: University of Central Florida Research Foundation, Inc., Orlando, FL (US); Goertek Inc., Shandong (CN)

(72) Inventors: Tao Zhan, Oviedo, FL (US); Yannanqi Li, Orlando, FL (US); Kun Yin, Oviedo, FL (US); Jianghao Xiong, Orlando, FL (US); Shin-Tson Wu, Oviedo, FL (US); Sheng Liu, Santa Clara, CA (US); Kun Li, Santa Clara, CA (US)

(73) Assignees: University of Central Florida Research Foundation, Inc., Orlando, FL (US); Goertek Inc., Weifang (CN)

( * ) Notice: Subject to any disclaimer, the term of this patent is extended or adjusted under 35 U.S.C. 154(b) by 319 days.

(21) Appl. No.: 18/276,934

(22) PCT Filed: Feb. 20, 2021

(86) PCT No.: PCT/CN2021/076988
§ 371 (c)(1),
(2) Date: Aug. 11, 2023

(87) PCT Pub. No.: WO2022/174405
PCT Pub. Date: Aug. 25, 2022

(65) Prior Publication Data
US 2024/0118547 A1    Apr. 11, 2024

(51) Int. Cl.
G02B 27/00    (2006.01)
G02B 27/01    (2006.01)
G02B 27/09    (2006.01)

(52) U.S. Cl.
CPC ..... *G02B 27/0172* (2013.01); *G02B 27/0018* (2013.01); *G02B 27/0955* (2013.01); *G02B 2027/0178* (2013.01)

(58) Field of Classification Search
CPC .......................... G02B 27/01; G02B 27/0101; G02B 27/0103; G02B 27/0149; G02B 27/017; G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116;
(Continued)

(56) References Cited

U.S. PATENT DOCUMENTS

2019/0287495 A1* 9/2019 Mathur ................... G06F 3/011
2023/0418052 A1* 12/2023 Grabarnik ............. G06V 40/18

* cited by examiner

*Primary Examiner* — Henry Duong
(74) *Attorney, Agent, or Firm* — Baker Botts LLP

(57) ABSTRACT

An optical display system and an electronics device are disclosed. The optical display system comprises: a display, which generating image light of a first polarization; a partial reflector, which transmits the image light without changing its polarization and reflects the image light with its polarization being changed to a second polarization; a first optic unit, placed after the partial reflector, which includes at least one refractive lens for chromatic aberration correction; and a reflection-type Pancharatnam-Berry lens, which is placed after the first optic unit and works in the Bragg regime, and which reflects the image light of the first polarization and transmits the image light of the second polarization.

10 Claims, 4 Drawing Sheets

(58) Field of Classification Search
CPC ...... G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02B 27/0018; G02B 27/0955; G02B 5/3016
USPC .......................................................... 359/630
See application file for complete search history.

OPTICAL DISPLAY SYSTEM AND ELECTRONICS DEVICE

CROSS-REFERENCE TO RELATED APPLICATIONS

This application is a National Stage of International Application No. PCT/CN2021/076988, filed on Feb. 20, 2021, which is hereby incorporated by reference in its entirety.

FIELD OF THE INVENTION

The present invention relates to optical system, and more specifically, to an optical display system and an electronics device.

BACKGROUND OF THE INVENTION

Optical display systems are extensively used in various electronics devices. In order to reduce the size of the optical display system and thus reduce the size the electronics device, a folded optical system may be used. For example, virtual reality devices often use such optical systems.

The virtual reality (VR) device has an imaging system to generate realistic images, and can generate sounds and other feelings that simulate the physical presence of a user in a virtual environment.

A head-mounted display (HMD) utilizes magnifying optics to magnify and project a display image to viewable size/distance. Immersive type HMDs are also referred to as virtual reality displays. This type of HMDs present contents to the eye box (viewer's eye occupies a region of space generally called an eye box), block the entire ambient, and offer an immersive virtual environment independent of the viewer's real surroundings. As a result, the contrast and quality of the displayed contents are directly related to the viewer's overall experience. Therefore, correctly displaying the contents is important, especially in multiple surfaces system with polarizing optical elements. Otherwise, it may induce stray light and ghost images that may reduce image quality.

In conventional configurations, the pancake lens display assembly of an HMD includes a pancake lens block and an electronic display. A leaky cavity of the HMD is formed by a partially reflective surface and a reflective polarizer to triples the optical path between them. The display light is converted to circular polarization before entering the cavity. There is a double reflection on the partially reflective surface, and at most 25% of the polarized display light enters a viewer's eyes. Since the brightness is not so demanding in VR, this pancake design is applicable considering its high resolution, wide field-of-view, and compact size achieved with the catadioptric design. The pancake viewing optics require the display image light to be circularly polarized. Thus, a quarter-wave plate and reflective polarizer are required for the system to provide a circularly polarized reflection without polarization state change.

Besides, when providing an immersive VR experience, the large field-of-view may also cause obvious color breakup around objects, especially peripheral items. Due to the wavelength-dependent focal length of the viewing optics, this visual artifact is called chromatic aberration (CA), which results from the dispersion characteristics of the dielectric constant. Although the perceptibility of this phenomenon depends on the viewer's gaze point and the displayed image content, it is vital to provide chromatic aberration correction (CAC) as well as distortion correction in the VR display to obtain a better viewing experience.

Therefore, there is a demand in the art that a new solution for optical display system shall be proposed to address at least one of the problems in the prior art.

SUMMARY OF THE INVENTION

One object of this invention is to provide a new technical solution for optical display system.

According to a first aspect of the present disclosure, an optical display system is provided, comprising: a display, which generating image light of a first polarization; a partial reflector, which transmits the image light without changing its polarization and reflects the image light with its polarization being changed to a second polarization; a first optic unit, placed after the partial reflector, which includes at least one refractive lens for chromatic aberration correction; and a reflection-type Pancharatnam-Berry lens, which is placed after the first optic unit and works in the Bragg regime, and which reflects the image light of the first polarization and transmits the image light of the second polarization.

According to a second aspect of the present disclosure, an electronics device is provided, comprising the optical display system according to an embodiment.

According to an embodiment of this disclosure, chromatic aberration can be reduced.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
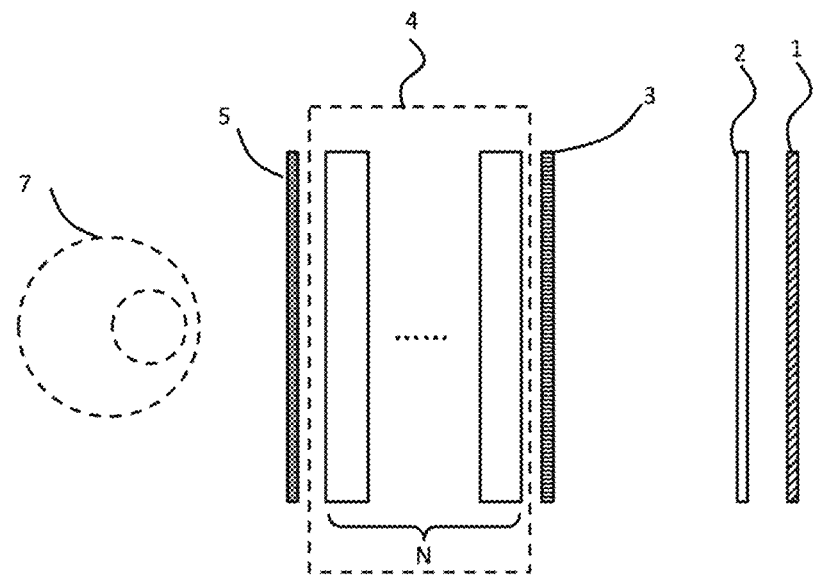
FIG. 1 is a schematic diagram of an optical display system according to an embodiment.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In an optical display system such as a pancake-like optical display system, chromatic aberration may have influence on the viewing feeling of a viewer who demands a high quality of viewing experiences. Here, we propose to exploit a reflection-type Pancharatnam-Berry lens (also referred to as reflective PBL), which is working in the Bragg regime, for such a kind of optical display system. This optical display system can be used in a VR display system. The quarter-wave plate and polarization reflector, which was generally used in a VR display system can be omitted as such and the chromatic aberration in the system can be corrected.

A person skilled in the art would understand that a reflective PBL can be made to selectively work on a circularly polarized light with positive or negative optical power, as reported in [Y. Li, T. Zhan, and S. T. Wu, "Flat cholesteric liquid crystal polymeric lens with low f-number," Opt. Here, we apply this theory in the optical display system, especially, the pancake-like optical display system.

FIG. 1 is a schematic diagram of an optical display system according to an embodiment.

As shown in FIG. 1, the optical display system comprises a display, a partial reflector 3, a first optic unit 4 and a reflection-type Pancharatnam-Berry lens 5.

The display generates image light of a first polarization. In FIG. 1, the display includes an image-generating element 1 and a polarizer 2. The polarizer 2 can modulate the image light generated by the image-generating element 1 to the first polarization. In some embodiment, the image-generating element 1 per se can generate image light of the first polarization. In such a case, the polarizer 2 can be omitted. For example, the image-generating element 1 is a liquid crystal display. The polarizer 2 may be circular polarizer which can convert the image light to a left-handed or right-handed circularly polarized image light.

The partial reflector 3 transmits the image light without changing its polarization and reflects the image light with its polarization being changed to a second polarization. For example, the second polarization is opposite to the first polarization. The first polarization is a left-handed or right-handed circularly polarization and the second polarization is a right-handed or left-handed circularly polarization. For example, the partial reflector 3 can is a 50/50 reflector, which can transmit 50% of the incident image light and reflect 50% of the incident image light.

The first optic unit 4 is placed after the partial reflector 3. It includes at least one refractive lens for chromatic aberration correction. FIG. 1, there are N refractive lenses, where N is equal to or more than 1.

The reflection-type Pancharatnam-Berry lens 5 is placed after the first optic unit 4 and works in the Bragg regime. It reflects the image light of the first polarization and transmits the image light of the second polarization.

The reflection-type Pancharatnam-Berry lens 5 is a diffraction optical element and has a negative Abbe number while the refractive lens in the first optic unit 4 has a positive Abbe number. So, the reflection-type Pancharatnam-Berry lens 5 can reduce the chromatic dispersion generated by the refractive lens. As such, the overall chromatic dispersion of the optical display system can be reduced and thus the displace quality can be improved.

The first optic unit 4 may include at least two refractive lenses. The Pancharatnam-Berry lens is an optical element which functions in connect with the frequency of the image light. As such, in consideration of costs and correction effects, two or more refractive lenses may achieve better chromatic aberration correction result and work well with the Pancharatnam-Berry lens. Furthermore, in view of display quality, one refractive lens will not provide a satisfactory display image for a viewer. So, in view of these, the number of the refractive lenses in the first optic unit 4 shall be equal to or more than 2.

One or more surfaces of the N refractive lenses in the first optic unit 4 can be shaped to be spherically concave, spherically convex, planar, rotationally symmetric aspheric, freeform shape, or some other shape.

For example, in FIG. 1, the image light generated by the image-generating element goes through the polarizer 2 and becomes an image light of left-handed circularly polarization. Then, 50% of the left-handed image light transmits the partial reflector 3 and goes through the first optics unit 4. The reflection-type Pancharatnam-Berry lens 5 reflects all of the incident left-handed image light (i.e. the remaining 50% left-handed image light) back to the first optics unit 4. The reflected image light hits the partial reflector 3 and the partial reflector 3 reflects another 50% of the left-handed image light (25% of image light generated by the image-generating element 1) and change it to right-handed image light. The right-handed image light goes through the first optics unit 4 and the reflection-type Pancharatnam-Berry lens 5. Finally, the right-handed image light goes into an eye 7 of a viewer.

Figure 2:
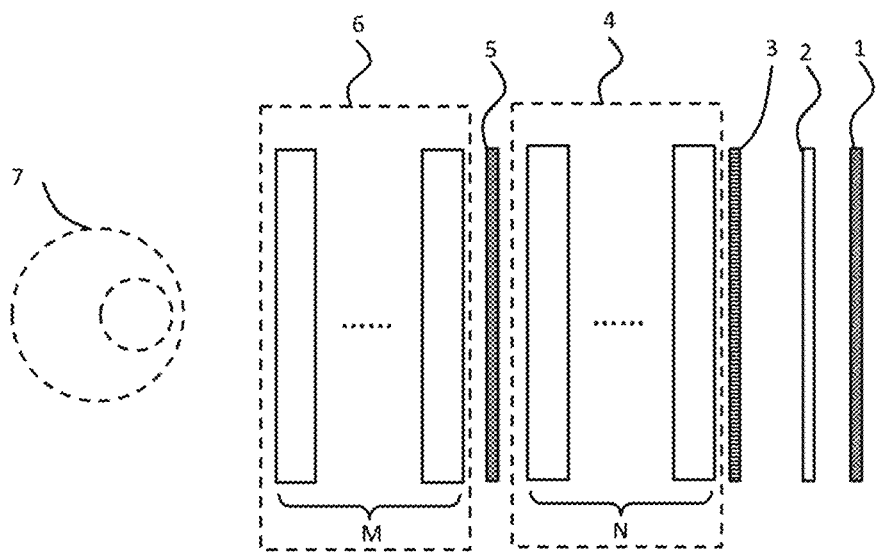
FIG. 2 is a schematic diagram of an optical display system according to another embodiment.

FIG. 2 shows a schematic diagram of an optical display system according to another embodiment.

In FIG. 2, the optical display system further comprises a second optics unit 6 placed after the reflection-type Pancharatnam-Berry lens 5. The second optics unit 6 has M refractive lenses, where M is equal to or more than 2. One or more surfaces of the M refractive lenses in the second optic unit 6 can be shaped to be spherically concave, spherically convex, planar, rotationally symmetric aspheric, freeform shape, or some other shape. At least one surface of the refractive lenses of the second optic unit 6 has an anti-reflective coating. The anti-reflective coating can reduce ghost images and enhance contrast.

Other components of the optical display system in FIG. 2 can be the same as those in FIG. 1. Thus, the repeated description of these components is omitted.

Figure 3A:
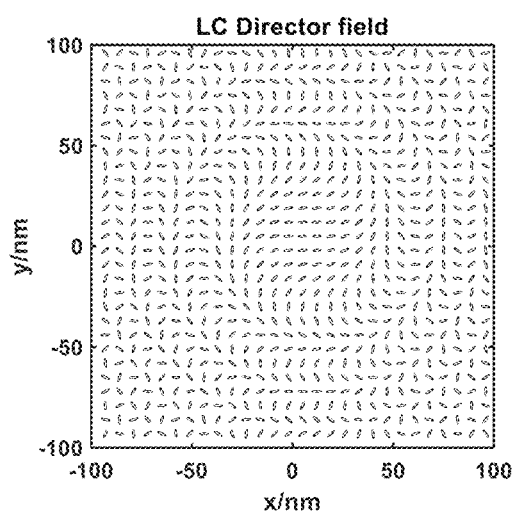
FIG. 3A is a schematic top view of a reflection-type Pancharatnam-Berry lens according to an embodiment.

FIG. 3A shows a schematic top view of a reflection-type Pancharatnam-Berry lens according to an embodiment. FIG. 3A depicts the liquid crystal anisotropy axis orientation distribution of the reflection-type Pancharatnam-Berry lens. The reflection-type Pancharatnam-Berry lens has patterned cholesteric liquid crystals (CLC).

Figure 3B:
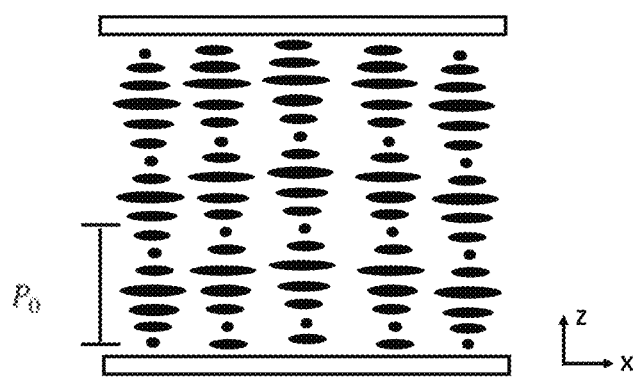
FIG. 3B is a schematic cross-sectional view of a reflection-type Pancharatnam-Berry lens structure with uniform pitch according to another embodiment.

FIG. 3B is a schematic cross-sectional view of a reflection-type Pancharatnam-Berry lens structure with uniform pitch according to another embodiment.

For a reflective PBL with uniform pitch, its cross-sectional view is illustrated in FIG. 3B. In FIG. 3B, along z direction, i.e. along the helical axis of the patterned structure, the cholesteric pitch P0 is uniform. The reflection-type Pancharatnam-Berry lens of FIG. 3B has a limited bandwidth (e.g., from 20 nm to 100 nm) mainly determined by the birefringence of LC host.

Figure 3C:
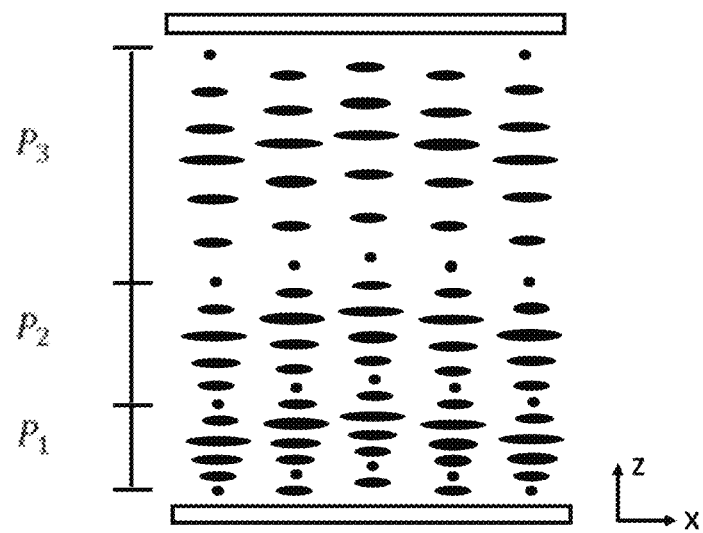
FIG. 3C is a schematic cross-sectional view of a reflection-type Pancharatnam-Berry lens structure with gradient pitches according to another embodiment.

FIG. 3C shows a schematic cross-sectional view of a reflection-type Pancharatnam-Berry lens structure with gradient pitches according to another embodiment. Along the helical axis, the pattern structure pitches increase gradually. In FIG. 3C, the shortest pitch P1 is at the bottom and the longest one P3 is on the top. In FIG. 3C, P1<P2<P3. With the help of gradient pitches, the reflection bandwidth can be much broader (for example, from 100 nm to 200 nm) compared to the one with uniform pitch (for example, the one in FIG. 3B).

For a reflection-type Pancharatnam-Berry lens, due to its polarization selectivity, it can reflect an image light of a first polarization and transmit an image light of a second polarization. For example, the right-handed circularly polarized image light will be reflected by the right-handed reflection-type Pancharatnam-Berry lens, while the left-handed circularly polarized component will pass through the reflection-type Pancharatnam-Berry lens. Similarly, the left-handed circularly polarized image light will be reflected by the left-handed reflection-type Pancharatnam-Berry lens, while the right-handed circularly polarized component will pass through without being affected.

Here, the reflection-type Pancharatnam-Berry lens may have a tunable working wavelength bandwidth. The thickness of the reflection-type Pancharatnam-Berry lens is between 0.1 and 20 micrometers. The birefringence of the reflection-type Pancharatnam-Berry lens is between 0.02 and 0.4. The reflection-type Pancharatnam-Berry lens is electrically addressable.

In FIG. 1 and/or in FIG. 2, at least one surface of the refractive lenses of the first optic unit 4 has an anti-reflective coating. The anti-reflective coating can reduce ghost images and enhance contrast.

Figure 4:
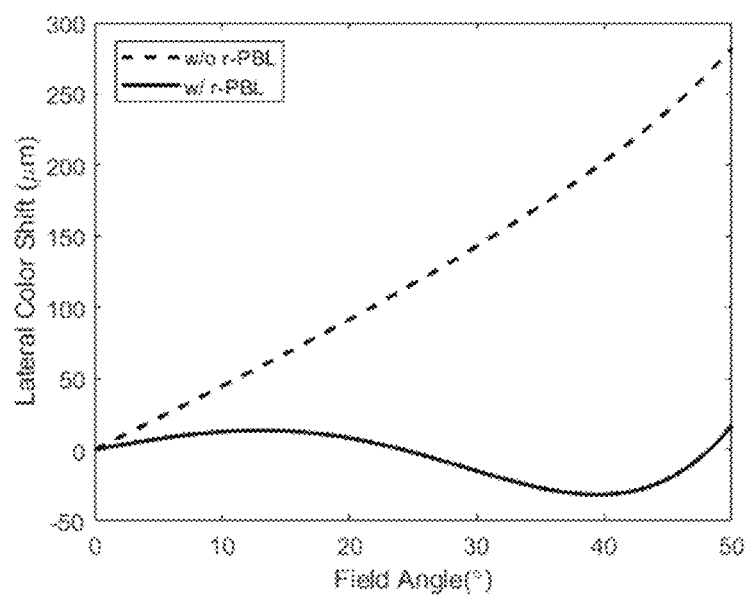
FIG. 4 is a an exemplary performance plot showing the difference between lateral color shift in an optical display system with a reflection-type Pancharatnam-Berry lens and that in an optical display system without a reflection-type Pancharatnam-Berry lens.

FIG. 4 is an exemplary performance plot showing the difference between lateral color shift in an optical display system with a reflection-type Pancharatnam-Berry lens and that in an optical display system without a reflection-type Pancharatnam-Berry lens. In FIG. 4, the r-PBL represents reflection-type Pancharatnam-Berry lens, the vertical ordinate represents the lateral color shifts, and the horizontal ordinate represents field angle.

The exemplary performance plot of FIG. 4 compares the lateral color shifts of optical display systems with a reflection-type Pancharatnam-Berry lens (solid line) and without a reflection-type Pancharatnam-Berry lens (dotted line). In this case, based on the optical raytracing analysis of the system shown in FIG. 2, adding a diffractive PBL can dramatically improve the lateral color shift. The maximum color shift in the optical display system with an added a reflection-type Pancharatnam-Berry lens is around 20 μm at 50°, which is much smaller than 280 μm in the original pancake system without the reflection-type Pancharatnam-Berry lens.

Figure 5:
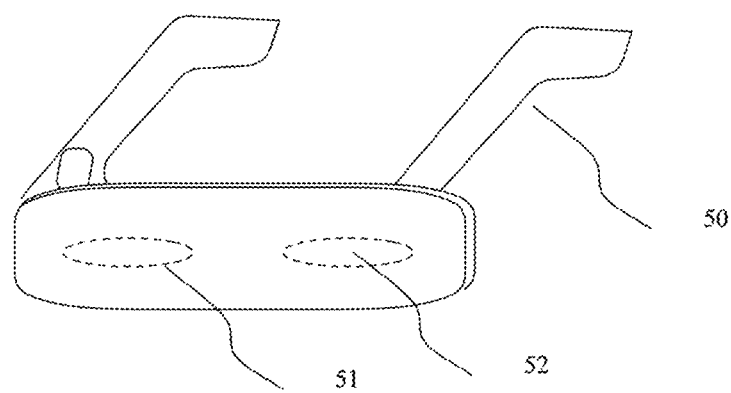
FIG. 5 is a schematic diagram of an electronics device according to an embodiment.

FIG. 5 is a schematic diagram of an electronics device according to an embodiment. The electronics device 50 comprising the optical display system 51 or optical display system 52 as described above. The electronics device 50 may be a head-mounted display.

Although some specific embodiments of the present invention have been demonstrated in detail with examples, it should be understood by a person skilled in the art that the above examples are only intended to be illustrative but not to limit the scope of the present invention.

What is claimed is:

1. An optical display system, comprising:
   a display, which generates image light of a first polarization;
   a partial reflector, which transmits the image light without changing its polarization and reflects the image light with its polarization being changed to a second polarization;
   a first optic unit, placed after the partial reflector, which includes at least a refractive lens for a chromatic aberration correction; and
   a refraction-type Pancharatnam-Berry lens, which is placed after the first optic unit and works in the Bragg regime, and which reflects the image light of the first polarization and transmits the image light of the second polarization.

2. The optical display system according to claim 1, wherein pattern structure pitches of the reflection-type Pancharatnam-Berry lens increase gradually along a helical axis of the reflection-type Pancharatnam-Berry lens.

3. The optical display system according to claim 1, wherein the first optic unit includes at least two refractive lenses.

4. The optical display system according to claim 3, wherein at least a surface of the refractive lenses has an anti-reflective coating.

5. The optical display system according to claim 1, wherein the reflection-type Pancharatnam-Berry lens has a tunable working wavelength bandwidth.

6. The optical display system according to claim 1, wherein the reflection-type Pancharatnam-Berry lens has a birefringence between 0.02 and 0.4.

7. The optical display system according to claim 1, wherein the reflection-type Pancharatnam-Berry lens is electrically addressable.

8. The optical display system according to claim 1, wherein the first polarization is opposite to the second polarization.

9. The optical display system according to claim 1, further comprising:
   a second optics unit placed after the reflection-type Pancharatnam-Berry lens.

10. An electronics device, comprising an optical display system according to claim 1.

* * * * *